US012605743B2

(12) United States Patent
Ando et al.

(10) Patent No.: US 12,605,743 B2
(45) Date of Patent: Apr. 21, 2026

(54) INSPECTION SORTING DEVICE AND SORTING DEVICE

(71) Applicant: System Square Inc., Nagaoka (JP)

(72) Inventors: Wataru Ando, Nagaoka (JP); Junji Moriyama, Nagaoka (JP); Motofumi Karasawa, Mitsuke (JP)

(73) Assignee: SYSTEM SQUARE INC., Niigata (JP)

( * ) Notice: Subject to any disclaimer, the term of this patent is extended or adjusted under 35 U.S.C. 154(b) by 0 days.

(21) Appl. No.: 18/866,069

(22) PCT Filed: Jul. 24, 2023

(86) PCT No.: PCT/JP2023/027079
§ 371 (c)(1),
(2) Date: Nov. 15, 2024

(87) PCT Pub. No.: WO2024/038735
PCT Pub. Date: Feb. 22, 2024

(65) Prior Publication Data

US 2025/0319495 A1 Oct. 16, 2025

(30) Foreign Application Priority Data

Aug. 16, 2022 (JP) ................................ 2022-129760

(51) Int. Cl.
*B07C 5/36* (2006.01)
*B07C 5/34* (2006.01)

(52) U.S. Cl.
CPC ............ *B07C 5/368* (2013.01); *B07C 5/3416* (2013.01)

(58) Field of Classification Search
CPC .............................. B07C 5/368; B07C 5/3416
See application file for complete search history.

(56) References Cited

U.S. PATENT DOCUMENTS 4,657,144 A 4/1987 Martin et al.
2002/0060174 A1 5/2002 Nakajima
(Continued)

FOREIGN PATENT DOCUMENTS

JP S61-195333 A 8/1986
JP H10-297754 A 11/1998
(Continued)

OTHER PUBLICATIONS

Notice of Reasons for Revocation in JP Application No. 2022-129760 mailed Jun. 10, 2025, 100 pp.
(Continued)

*Primary Examiner* — Michael McCullough
*Assistant Examiner* — Kalyanavenkateshware Kumar
(74) *Attorney, Agent, or Firm* — HAUPTMAN HAM, LLP

(57) ABSTRACT

An inspection sorting device includes a conveying unit that conveys the inspection target; an electromagnetic wave irradiation unit for irradiating electromagnetic waves to the inspection target; an electromagnetic wave detection unit detects electromagnetic waves transmitted through the inspection target; an inspection unit that inspects the inspection target based on the detected electromagnetic waves; a gas supply unit for supplying gas; a gas distribution unit that distributes the gas to a plurality of discharge outlets; a plurality of injection control units that control the discharge of gas from the discharge outlets. A plurality of gas injection units are downstream of the electromagnetic wave detection unit and aligned; a plurality of interconnection units that are one-to-one flow paths between the discharge outlets and the gas injection units. A sorting control unit specifies the object to be sorted based on the inspection result in the inspection unit and controls the injection control unit.

15 Claims, 6 Drawing Sheets

(56) References Cited

U.S. PATENT DOCUMENTS

| | | | | |
|---|---|---|---|---|
| 2013/0264249 | A1 * | 10/2013 | Sommer, Jr. | B07C 5/342<br>209/589 |
| 2018/0001353 | A1 * | 1/2018 | Stockard | B07C 5/368 |
| 2024/0261823 | A1 | 8/2024 | Okimoto et al. | |

FOREIGN PATENT DOCUMENTS

| | | | | |
|---|---|---|---|---|
| JP | H11-179294 | A | | 7/1999 |
| JP | H11-267596 | A | | 10/1999 |
| JP | 2000-185263 | A | | 7/2000 |
| JP | 2002-153822 | A | | 5/2002 |
| JP | 2010-094652 | A | | 4/2010 |
| JP | 2012236135 | A | * | 12/2012 |
| JP | 2017-164722 | A | | 9/2017 |
| JP | 2017164723 | A | | 9/2017 |
| JP | 2019-130483 | A | | 8/2019 |
| JP | 7115595 | B1 | | 8/2022 |
| JP | 7274836 | B2 | | 5/2023 |
| WO | 9504611 | A1 | | 2/1995 |
| WO | 2017159629 | A1 | | 9/2017 |

OTHER PUBLICATIONS

Notice of Reasons for Revocation in JP Application No. 2022-129760 mailed Nov. 11, 2024, 35pp.

Office Action in JP Application No. 2022-129760 mailed Aug. 22, 2023, 14pp.

Office Action in JP Application No. 2022-129760 mailed Oct. 31, 2023, 9pp.

* cited by examiner

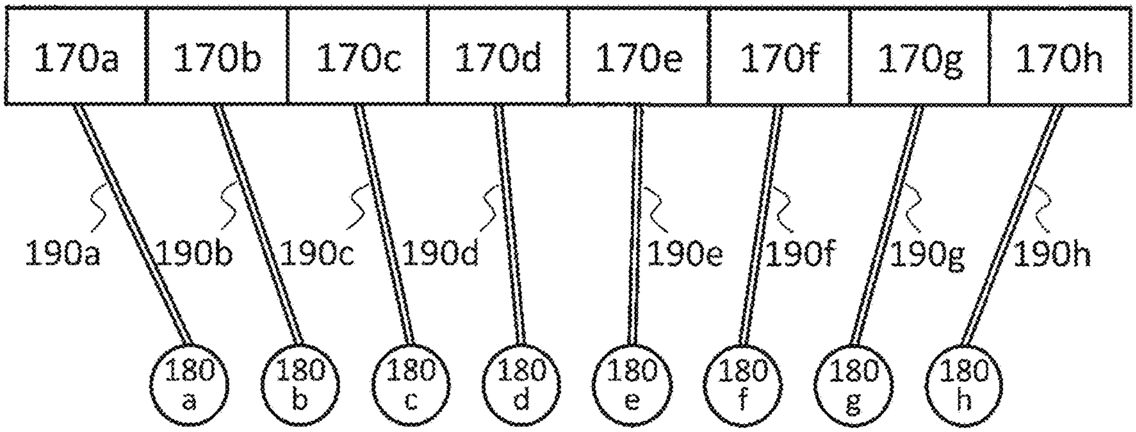
Fig.4
Fig. 5A
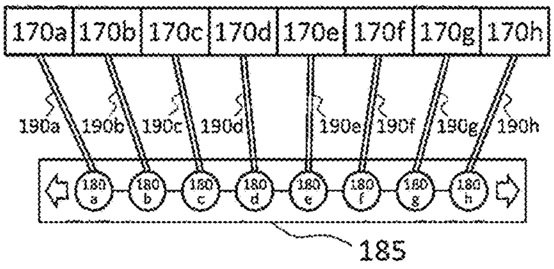
Fig. 5B
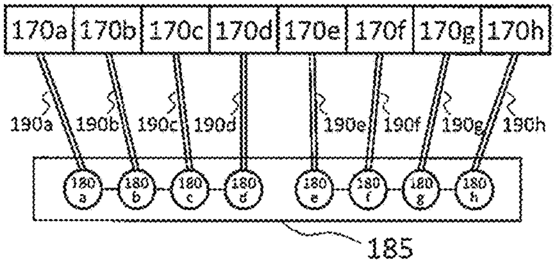
Fig. 5C
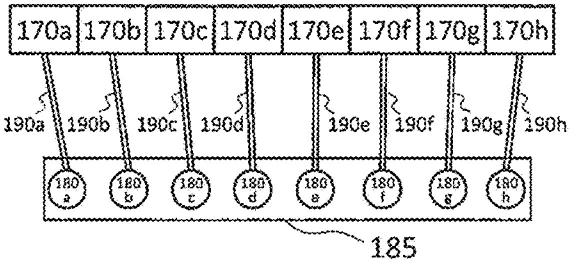

INSPECTION SORTING DEVICE AND SORTING DEVICE

RELATED APPLICATIONS

The present application is a National Phase of International Application Number PCT/JP2023/027079 filed Jul. 24, 2023, which claims the benefit of priority from Japanese Patent Application No. 2022-129760, filed on Aug. 16, 2022.

TECHNICAL FIELD

This invention relates to an inspection sorting device and a sorting device that inspects an inspection target based on electromagnetic waves that are irradiated onto the inspection target and detected through the inspection target and performs sorting based on the inspection result.

BACKGROUND ART

Assuming that a conveyor conveying granular objects to be inspected conceives of a plurality of regions separated at certain intervals in the width direction perpendicular to the conveying direction, an inspection device is known that has gas injection units (nozzles) in each of a plurality of areas, identifies areas where granular object containing contamination that needs to be removed exists based on the X-ray transmission image of the granular object, and removes it by applying force to the granular object by injecting gas from the gas injection unit of the identified area at a time when the object reaches the injection unit in the identified area (see, for example, Patent Document 1).

PRIOR ART REFERENCES

Patent Documents

Patent Document 1: JP2017-164722A

SUMMARY OF THE INVENTION

Problems to be Solved by the Invention

When a plurality of gas injection units are provided, a gas distribution unit that distributes gas from a gas source to the plurality of gas injection units, and injection control units, which are valves that control gas injection, are provided at each of the plurality of gas outlets of the gas distribution unit, and the gas injection units are directly connected to their respective the injection control units. Namely, the gas distribution unit, the injection control units, and the gas injection units are integrally composed. Therefore, it was not possible to flexibly configure the arrangement of the gas injection units.

The present invention was made in view of the above-mentioned problems, and it is an object to provide an inspection sorting device and a sorting device in which the arrangement of the gas injection units can be flexibly configured.

Means for Solving the Problems

The inspection sorting device according to the present invention performs sorting by injecting gas toward the object to be sorted, which is identified based on the inspection result of an inspection target. The inspection sorting device comprises: a conveying unit that conveys the inspection target in a predetermined conveying direction; an electromagnetic wave irradiation unit for irradiating electromagnetic waves to the inspection target; an electromagnetic wave detection unit detects electromagnetic waves that have transmitted through the inspection target; an inspection unit that inspects the inspection target based on the electromagnetic waves detected by the electromagnetic wave detection unit; a gas supply unit for supplying gas; a gas distribution unit that distributes supplied gas to a plurality of discharge outlets; a plurality of injection control units that control the discharge of gas from the discharge outlets; a plurality of gas injection units provided downstream in the conveying direction of the electromagnetic wave detection unit and aligned along a direction that intersects the conveying direction; a plurality of interconnection units that are one-to-one flow paths between the discharge outlets and the gas injection units and that direct the gas discharged from the discharge outlets to the gas injection units for injection; and a sorting control unit that specifies the object to be sorted based on the inspection result in the inspection unit and controls the injection control unit.

The conveying unit may be a conveyor.

The electromagnetic waves may be X-rays.

The inspection sorting device may further include a position adjusting unit that supports the plurality of gas injection units enabling position adjustment of the gas injection units.

The position adjusting unit may be capable of adjusting the positions of the plurality of gas injection units collectively.

The position adjusting unit may be capable of adjusting the positions of the plurality of gas injection units collectively for each group of the plurality of gas injection units divided into two or more groups.

The position adjusting unit may be capable of adjusting the position of each gas injection unit.

The injection control unit, the gas injection unit, or a notification unit that detects gas injection from the gas injection unit may give notification of the gas injection by a predetermined method.

The gas distribution unit, the injection control units, and the sorting control units may be provided in a separate space from the interconnection unit and gas injection unit.

The injection control unit units may be aligned in a greater number of rows than the number of rows in which the gas injection units are aligned.

The plurality of interconnection units may have approximately the same length.

The sorting device according to the present invention performs sorting by injecting gas toward the object to be sorted. The sorting device comprises: a gas supply unit for supplying gas; a gas distribution unit that distributes supplied gas to a plurality of discharge outlets; a plurality of injection control units that control the discharge of gas from the discharge outlets; a plurality of gas injection units; and a plurality of interconnection units that are one-to-one flow paths between the discharge outlets and the gas injection units and that direct the gas discharged from the discharge outlets to the gas injection units for injection.

The inspection sorting device may further include a position adjusting unit that supports the plurality of gas injection units enabling position adjustment of the gas injection units.

The position adjusting unit may be capable of adjusting the positions of the plurality of gas injection units collectively.

The position adjusting unit may be capable of adjusting the positions of the plurality of gas injection units collectively for each group of the plurality of gas injection units divided into two or more groups.

The position adjusting unit may be capable of adjusting the position of each gas injection unit.

The injection control unit, the gas injection unit, or a notification unit that detects gas injection from the gas injection unit may give notification of the gas injection by a predetermined method.

Effects of Invention

According to the inspection sorting device and sorting device of the present invention, the arrangement of the gas injection units can be flexibly configured.

BRIEF DESCRIPTION OF THE DRAWINGS

FIG. 4 is a diagram showing the relationship of the arranging widths of the injection control units and the gas injection units.

FIGS. 5A to 5C are diagrams showing an example of the arrangement of a plurality of gas injection units.

DESCRIPTION OF EMBODIMENTS

Figure 1:
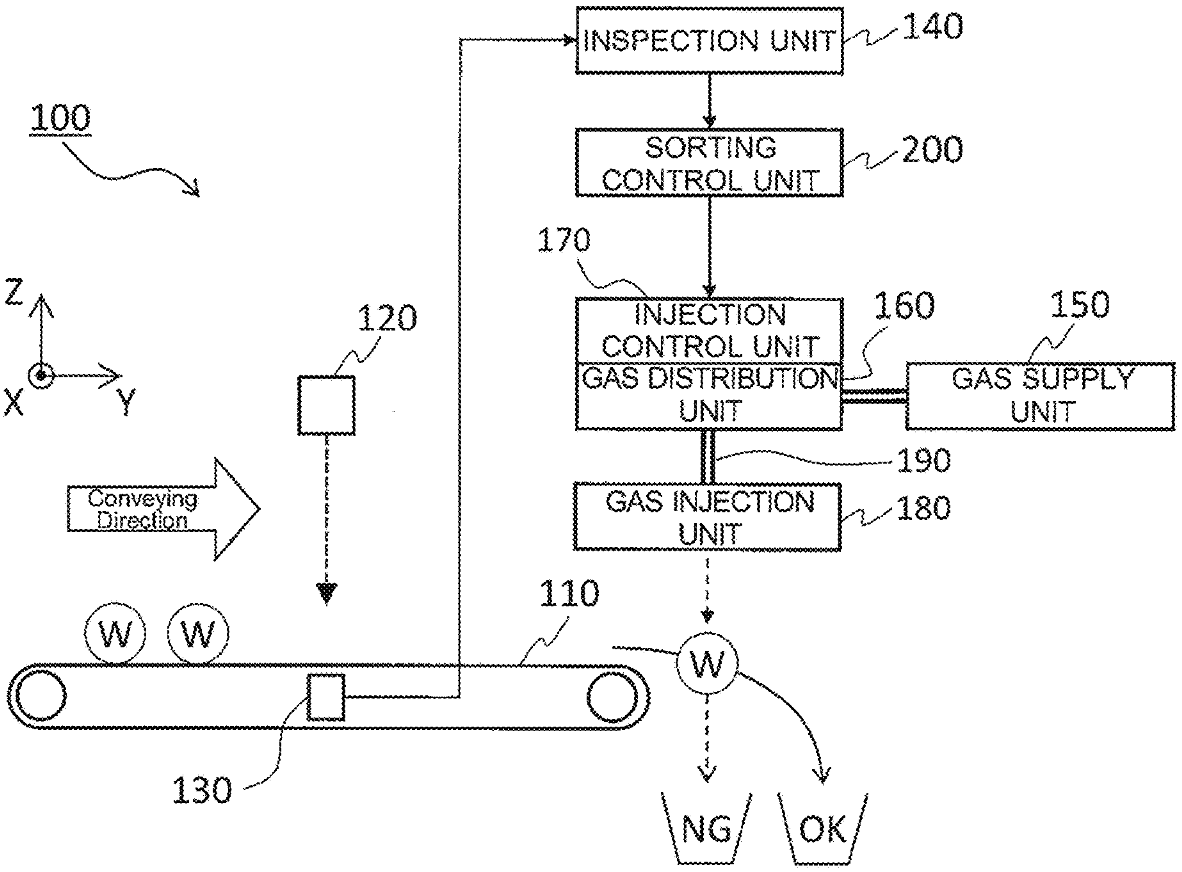
FIG. 1 is a diagram showing the functional configuration of the inspection sorting device 100 according to the present invention.

Embodiments of the present invention will be described below with reference to the drawings. In the following description, units already described are denoted by the same reference numerals, and description thereof is omitted.

Figure 2:
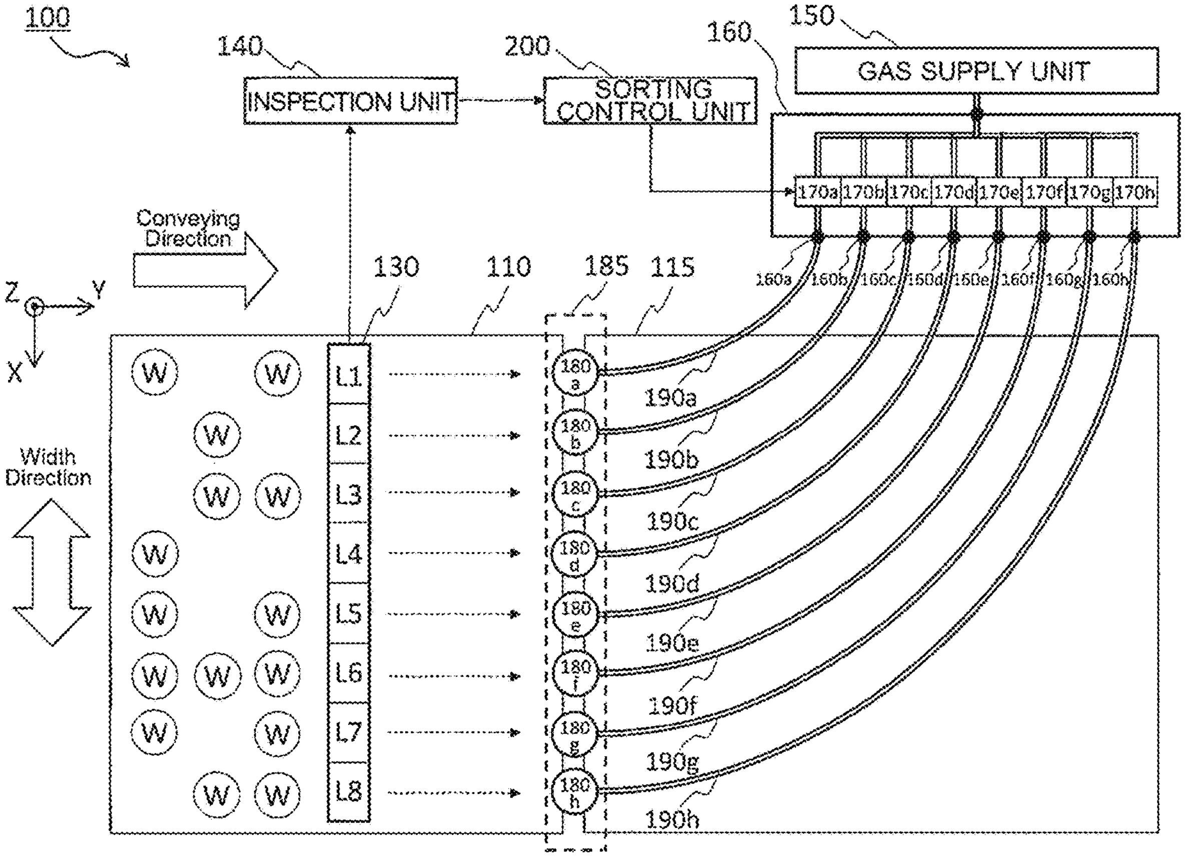
FIG. 2 is a diagram specifically showing the configuration related to the sorting function in FIG. 1.

FIG. 1 is a configuration diagram of the inspection sorting device 100 of the present invention according to the present invention, and FIG. 2 is a diagram specifically showing the configuration related to the sorting function in FIG. 1.

The inspection sorting device 100 includes a conveying unit 110, an electromagnetic wave irradiation unit 120, an electromagnetic wave detection unit 130, an inspection unit 140, a gas supply unit 150, a gas distribution unit 160, injection control units 170, gas injection units 180, interconnection units 190, and a sorting control unit 200.

The conveying unit 110 is a conveyor of any type that conveys the placed inspection target W in a predetermined conveying direction (in the Y-axis direction of FIG. 1). The conveying unit 110 has a depth in the width direction (X-axis direction in FIG. 1) that intersects the conveying direction when viewed from the front in FIG. 1. Each inspection target W is usually placed and conveyed at one of a plurality of placement positions that divide the conveying unit 110 in the width direction by an equal width, or over two or more consecutive placement positions. The number of placement positions may be determined appropriately according to the size of the inspection target W, arrangement of the detection elements in the electromagnetic wave detection unit 130, arrangement of the gas injection units 180, and other factors.

The electromagnetic wave irradiation unit 120 irradiates the inspection target W conveyed by the conveying unit 110 with predetermined electromagnetic waves. The electromagnetic waves for irradiation may be selected according to the nature of the inspection, for example, X-rays, visible light, infrared rays, etc.

The electromagnetic wave detection unit 130 is provided at a position where electromagnetic waves radiated from the electromagnetic wave irradiation unit 120 and passing through the inspection target W can be detected. In FIG. 1, an example is shown in which the electromagnetic wave detection unit is positioned opposite the electromagnetic wave irradiation unit 120 to enable detection of the electromagnetic waves transmitted through the inspection target W. The electromagnetic wave detection unit 130 includes a plurality of detection elements aligned in the width direction of the conveying unit 110, each of which detects electromagnetic waves arriving through the inspection target W or directly, and outputs detection data at each predetermined periodic cycle.

The number of aligned detection elements is, for example, the number corresponding to the length in the width direction in which the inspection target W is placed on the conveying unit 110. The cycle in which each detection element detects electromagnetic waves and accumulates and outputs detection data may be, for example, the required time to pass the width of the detection element in the conveying direction at the conveying speed of the conveying unit 110. By setting the number of aligned units and the detection cycle in this way, the inspection targets W, which passes through the electromagnetic wave detection unit 130 one after another, can be inspected without oversight.

Detection of electromagnetic waves at each placement position in the conveying unit 110 is carried out by detection element group consisting of a number of detection elements aligned in the width direction of the conveying unit 110 divided by the number of placement positions in the conveying unit 110. FIG. 2 shows an example in which there are eight placement positions, and in this case, each of the eight detection element groups L1 to L8 is responsible for detecting electromagnetic waves that pass through the inspection target W being conveyed at corresponding one of the eight placement positions. For example, if the total number of detection elements in the width direction is 128, each of the eight detection element groups L1 to L8 consists of 16 detection elements.

The inspection unit 140 inspects the detection data periodically output from each detection element group of the electromagnetic wave detection unit 130, and identifies whether there was an abnormality in the detection data of any of the detection element groups.

The gas supply unit 150 is a gas supply source that supplies gas to be injected from the gas injection units 180. Gas species are arbitrary as long as they do not cause problems for the inspection target W or the environment in which they are installed.

The gas distribution unit 160 is a manifold that distributes the gas supplied at the inlet from the gas supply unit 150 to a plurality of discharge outlets. If it is desired to perform sorting at each placement position of the conveying unit 110, the gas should be distributed to the number of placement positions.

The injection control units 170 are valves installed in each path to the plurality of discharge outlets of the gas distribution unit 160 that control the injection of gas from the discharge outlets. Valve operation is controlled by the sorting control unit 200, as described later. FIG. 2 shows an example in which there are eight placement positions in the conveying unit 110. The injection control units 170*a*-170*h* are provided in the respective paths to the eight discharge outlets 160*a*-160*h* of the gas distribution unit 160.

The gas injection units 180 are nozzles that inject gas. The injection units 180 are provided downstream in the conveying direction of the electromagnetic wave detection unit 130, and the same number of the gas injection units 180 as the number distributed by the gas distribution unit 160 are aligned along the width direction of the conveying unit 110. FIG. 2 shows an example of the arrangement alignment of the gas injection units 180 in the case where there are eight placement positions in the conveying unit 110. The gas injection units 180*a* to 180*h* are provided downstream in the conveying direction of the detection element groups L1 to L8 of the electromagnetic wave detection unit 130, respectively.

The gas outlets of the gas injection units 180 are set at a position and direction where the injected gas hits the inspection target W and provides sufficient change in traveling direction for sorting when the inspection target W conveyed by the conveying unit 110 arrives and the gas is injected.

As a configuration sorting by gas injection, for example, as shown in FIG. 1, a configuration for sorting by changing the landing position by injecting gas from the end of the conveying unit 110 in the conveying direction toward the falling inspection target W can be taken as an example. Specifically, for example, an "OK" box is installed at the position where the inspection target W is thrown horizontally from the end of the conveying direction of the conveying unit 110 at a conveying speed in the conveying direction, falls gradually, and lands on if no gas is injected, and an "NG" box is placed at the position where the object would land if gas is injected. The position of the "NG" box is determined according to the position and direction of the gas outlet of the gas injection unit 180. FIG. 1 shows an example where the gas outlet is directed straight down.

When gas is injected at the appropriate timing from the gas outlet provided in this way and hits the falling inspection target W, the traveling direction of the inspection target W changes to a straight downward direction, and the inspection target W eventually falls into the "NG" box placed at the position where it is to land. That is, the inspection target W that reaches the end of the conveying direction of the conveying unit 110 can be sorted in such a way that if no gas is injected, the inspection target W falls into the "OK" box, and if gas is injected, the inspection target W falls into the "NG" box placed closer to the end in the conveying direction than the "OK" box.

Figure 3:
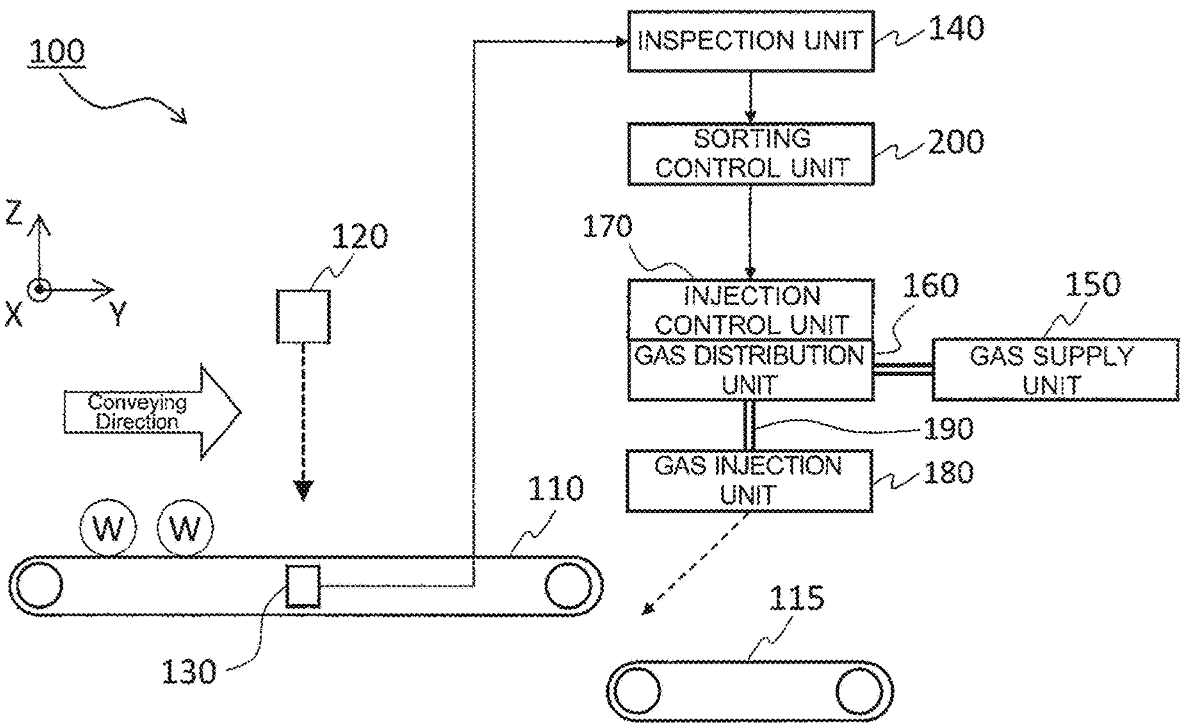
FIG. 3 is another diagram showing the functional configuration of the inspection sorting device 100 according to the present invention.

As another configuration for sorting by gas injection, for example, as shown in FIG. 3, a conveying unit 115 is provided downstream of the end of the conveying direction of the conveying unit 110 with a gap and step through which the inspection target W can pass through, and gas is injected toward the falling inspection target W in the gap to sort the same. Specifically, at the position where the inspection target W, which is conveyed by the conveying unit 110, falls from the end of the conveying direction of the conveying unit 110 and lands, the conveying unit 115 is provided to convey the landed inspection target W in a certain direction. The position and direction of the gas outlet is set so that the traveling direction of the inspection target W is directed toward the gap between the conveying unit 110 and the conveying unit 115 as the injected gas hits the inspection target.

When gas is injected at the appropriate timing from the gas outlet provided in this way and hits the falling inspection target W, the traveling direction of the inspection target changes toward the gap, and the inspection target W falls into a receiving tray or the like, which is not shown in the figure, located beyond the gap. That is, the inspection target W that reaches the end of the conveying direction of the conveying unit 110 can be sorted in such a way that if no gas is injected, the inspection target W falls on the conveying unit 115 and continues to be conveyed, and if gas is injected, the inspection target W falls into a receiving tray or the like.

In order to separately continue conveying the inspection target W, which has undergone a change in traveling direction due to the hit of the injected gas, another conveying unit, not shown in the figure, may be provided at the position where the inspection target W, which has undergone the change in traveling direction, falls down.

The interconnection units 190 are channels that connect the discharge outlets of the gas distribution unit 160 and the gas injection units 180 on a one-to-one basis, guiding the gas distributed by the gas distribution unit 160 to the gas injection units 180 so that the gas can be injected. In the example in FIG. 2, each of the discharge outlets 160*a*-160*h* and each of the gas injection units 180*a*-180*h* are connected by the interconnection units 190*a*-190*h*. As a material for the interconnection unit 190, a hose or tube of vinyl chloride, silicone rubber, polyurethane resin or the like is suitable, as the gas can pass through it and the gas injection unit 180 can be flexibly arranged.

The sorting control unit 200 identifies the object to be sorted based on the inspection result of the inspection target W in the inspection unit 140, and controls the injection control unit 170 to inject gas from the gas injection unit 180 at the timing when the object to be sorted pass through the gas injection unit 180. The object to be sorted in the present invention means the inspection target W, which is subjected to a gas injection from the gas injection unit 180 based on the inspection result. Therefore, it may be arbitrarily decided whether the inspection target W, whose inspection result is abnormal, or the inspection target, whose inspection result is normal, should be the object to be sorted. In the following explanation, it is assumed that the inspection target W, whose inspection result is abnormal, is the object to be sorted.

Specifically, for example, if there is an abnormality in the detection data for a certain detection cycle in the detection element group L5 of the electromagnetic wave detection unit 130 when there are eight placement positions in the conveying unit 110 as shown in FIG. 2, the sorting control unit 200 identifies the inspection target W that was at the position where transmitted electromagnetic waves were detected in the detection element group L5 of the electromagnetic wave detection unit 130 during that detection cycle as an object to be sorted. Then, the object to be sorted will reach the position of the gas injection unit 180*e* corresponding to the detection element group L5 after a time period specified from the conveying speed by the conveying unit 110 and the distance from the electromagnetic wave detection unit 130 to the gas injection unit 180, and at this timing, the injection control unit 170 is controlled to cause the gas injection unit 180 to inject gas. Thereby, the injected gas can hit the object to be sorted and change the traveling direction thereof.

In the inspection sorting device 100 configured as described above, the injection control unit 170 and the gas injection unit 180 are connected via the interconnection unit 190 and are not integrally configured, so the arrangement of the gas injection unit 180 is not constrained by the arrangement of the injection control unit 170. Therefore, it is possible to flexibly configure the arrangement of the gas injection units 180. Generally, the width of the injection control unit 170, which is a valve, is wider than the width of the gas injection unit 180, which is a nozzle, but according to the configuration of the present invention, as shown in FIG. 4, for example, the total width of the gas injection units 180*a* to 180*h* can be narrower than the total width of the injection control units 170*a* to 170*h*, thus this allows for greater flexibility in the configuration of the device.

The inspection sorting device may: further include a position adjusting unit 185 that supports the plurality of gas injection units 180 enabling position adjustment of the gas injection units 180. The adjustment of position includes, for example, at least adjustment of the conveying direction (Y-axis direction), width direction (X-axis direction), height direction (Z-axis direction), injection angle, etc. It can be configured so that the position can be adjusted manually, or a drive mechanism may be provided. FIGS. 5A to 5C show examples of the configuration of the position adjustment unit 185. FIG. 5A shows an example in which the positions of the plurality of gas injection units 180 can be adjusted collectively. FIG. 5B shows an example in which the position of a plurality of gas injection units 180 can be adjusted collectively for each group of the plurality of gas injection units 180 divided into two or more groups. FIG. 5C shows an example in which the position of each of the gas injection units 180 can be adjusted. By providing a position adjusting unit 185, it is possible to change the positions of the plurality of gas injection units 180 depending on the size and shape of the inspection target W.

Figure 6:
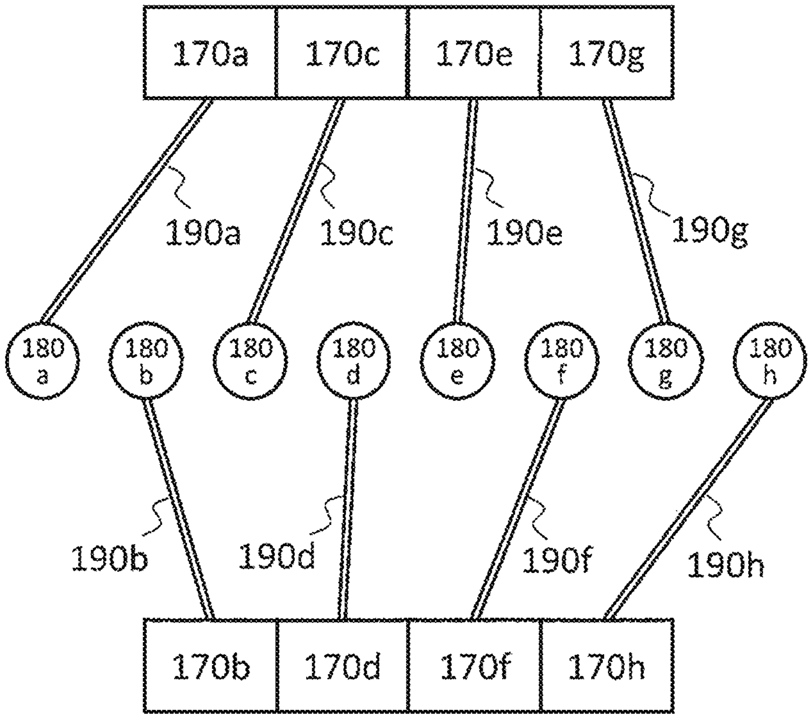
FIG. 6 is a diagram showing an example of the arrangement of a plurality of injection control units.

In addition, the injection control units 170 and the gas injection units 180 are not integrally assembled, but are connected via the interconnection unit 190. This makes it possible to arrange the same number of injection control units 170 and gas injection units 180*a*-180*h* in different numbers of rows, for example, as shown in FIG. 6, where the gas injection units 180*a*-180*h* are arranged in one row while the injection control units 170*a*-170*h* are arranged in two rows. Therefore, in cases where the width of the device had to be increased because the injection control unit 170 is broad, even though the conveying unit 110 and the gas injection units 180 can be configured in a narrow width, the increase in the width of the device can be avoided by arranging the injection control unit 170 in a greater number of rows than the number of rows in which the gas injection units 180 are arranged. In this case, from the viewpoint of avoiding the complexity of control by the sorting control unit 200, it is desirable that the length of interconnection units 190 be approximately the same. For example, in the case of two rows of injection control units 170*a*-170*h*, instead of simply dividing them into injection control units 170*a*-170*d* and injection control units 170*e*-170*h*, injection control units may be arranged so that the gas injection units 180*a*-180*h* are provided with alternating interconnection units from each row of injection control units, as shown in FIG. 6.

In addition, a function may be provided to notify gas injection from each of the gas injection units 180. For example, the function may be provided directly in the gas injection unit 180, or in the injection control unit 170 corresponding to the gas injection unit 180. There may also be provided the notification section (not shown) that receives information indicating gas injection from the injection control unit 170 or the gas injection unit 180 and provides a notification. The method of notification is arbitrary and may be, for example, by illumination of a lamp or an alarm sound. When using lamps, specifically, for example, lamps may be provided in each injection control unit 170 or each gas injection unit 180 and illuminated during gas injection, or a lamp corresponding to each gas injection unit 180 may be provided on the housing of the inspection sorting device 100 or the notification unit and illuminated during gas injection. By providing such a notification function, it becomes easier to recognize whether or not gas has been injected from the respective gas injection unit 180 and to confirm the normality of the operation.

Figure 7:
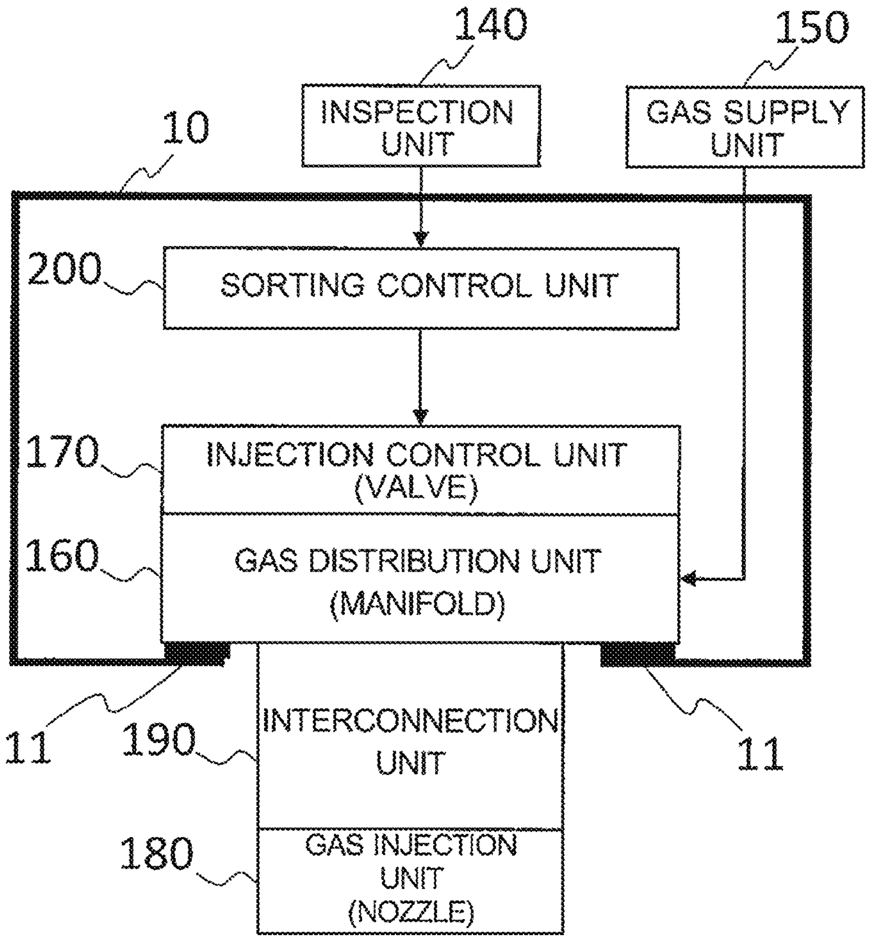
FIG. 7 is a diagram showing an example of a measure that separates the control mechanism from the other components.

In the inspection sorting device 100 of the present application, different from conventional device, the gas distribution unit 160 and the gas injection unit 180 are separated, so it is possible to take measures to place the gas distribution unit 160, the injection control unit 170, and the sorting control unit 200: a separate space from the interconnection unit 190 and the gas injection unit 180. For example, as shown in FIG. 7, the gas distribution unit 160, the injection control units 170, and the sorting control unit 200 may be sealed by enclosing them in a partially opened partitioning wall 10, covering the opening with a lid on the side of the gas distribution unit 160 where the interconnection units 190 are attached, and filling the gap between the gas distribution unit 160 and the partitioning wall 10 with a packing 11. Thus, by sealing the control mechanisms such as the gas distribution unit 160, the injection control units 170, and the sorting control unit 200, and placing them in a space where moisture, dust, or liquids cannot or are unlikely to enter from the outside, deterioration of the control functions and occurrence of failures can be prevented.

The present invention is not limited to the above embodiments. The above embodiments are examples, and any embodiment that has substantially the same configuration as the technical concept described in the claims of the present invention and achieves similar effects is included in the technical scope of the present invention. In other words, changes can be made as appropriate within the scope of the technical ideas expressed in the present invention, and forms with such changes and improvements are also included in the technical scope of the present invention.

For example, among the inspection sorting device 100, the gas supply unit 150, the gas distribution unit 160, the injection control units 170, the gas injection units 180, the position adjusting unit 185, and the interconnection units 190, which are the sorting mechanisms, may be configured as a stand-alone sorting device and can be used in combination with another inspection device.

The invention claimed is:

1. An inspection sorting device that performs sorting by injecting gas toward an object to be sorted, which is identified based on the inspection result of an inspection target, comprising:

- a conveying unit that conveys the inspection target in a predetermined conveying direction;
- an electromagnetic wave irradiation unit for irradiating electromagnetic waves to the inspection target;
- an electromagnetic wave detection unit detects electromagnetic waves that have been transmitted through the inspection target;
- an inspection unit that inspects the inspection target based on the electromagnetic waves detected by the electromagnetic wave detection unit;
- a gas supply unit for supplying gas;
- a gas distribution unit that distributes supplied gas to a plurality of discharge outlets;
- a plurality of injection control units that control the discharge of gas from the discharge outlets;
- a plurality of gas injection units provided downstream in the conveying direction of the electromagnetic wave detection unit and aligned along a direction that intersects the conveying direction;

a plurality of interconnection units, which are hoses or tubes formed of a flexible material, that are one-to-one flow paths between the discharge outlets and the gas injection units and that direct the gas discharged from the discharge outlets to the gas injection units for injection;

a sorting control unit that specifies the object to be sorted based on the inspection result in the inspection unit and controls the injection control unit; and a position adjusting unit that supports the plurality of gas injection units so that the positions of the gas injection units can be adjusted, wherein the position adjusting unit is capable of adjusting the positions of the plurality of gas injection units collectively.

2. The inspection sorting device according to claim 1, wherein the conveying unit is a conveyor.

3. The inspection sorting device according to claim 1, wherein the electromagnetic waves are X-rays.

4. The inspection sorting device, according to claim 1, wherein the injection control unit gives notification of the gas injection using a predetermined method.

5. The inspection sorting device, according to claim 1, wherein the gas injection unit gives notification of the gas injection using a predetermined method.

6. The inspection sorting device according to claim 1, further comprising a notification unit that detects gas injection from the gas injection unit and gives notification of the gas injection.

7. The inspection sorting device according to claim 1, wherein the gas distribution unit, the injection control unit, and the sorting control unit are provided in a separate space from the interconnection unit and gas injection unit.

8. The inspection sorting device according to claim 1, wherein the injection control units are arranged in a greater number of rows than the number of rows in which the gas injection units are arranged.

9. The inspection sorting device according to claim 8, wherein the plurality of the interconnection units are of approximately the same length.

10. An inspection sorting device that performs sorting by injecting gas toward an object to be sorted, which is identified based on the inspection result of an inspection target, comprising:

a conveying unit that conveys the inspection target in a predetermined conveying direction;

an electromagnetic wave irradiation unit for irradiating electromagnetic waves to the inspection target;

an electromagnetic wave detection unit detects electromagnetic waves that have been transmitted through the inspection target;

an inspection unit that inspects the inspection target based on the electromagnetic waves detected by the electromagnetic wave detection unit;

a gas supply unit for supplying gas;

a gas distribution unit that distributes supplied gas to a plurality of discharge outlets;

a plurality of injection control units that control the discharge of gas from the discharge outlets;

a plurality of gas injection units provided downstream in the conveying direction of the electromagnetic wave detection unit and aligned along a direction that intersects the conveying direction;

a plurality of interconnection units, which are hoses or tubes formed of a flexible material, that are one-to-one flow paths between the discharge outlets and the gas injection units and that direct the gas discharged from the discharge outlets to the gas injection units for injection;

a sorting control unit that specifies the object to be sorted based on the inspection result in the inspection unit and controls the injection control unit; and a position adjusting unit that supports the plurality of gas injection units so that the positions of the gas injection units can be adjusted, wherein the position adjusting unit is configured to collectively adjust the positions of the gas injection units within each of two or more groups of the plurality of gas injection units.

11. A sorting device that performs sorting by injecting gas toward an object to be sorted, comprising:

a gas supply unit for supplying gas;

a gas distribution unit that distributes supplied gas to a plurality of discharge outlets;

a plurality of injection control units that control the discharge of gas from the discharge outlets;

a plurality of gas injection units;

a plurality of interconnection units, which are hoses or tubes formed of a flexible material, that are one-to-one flow paths between the discharge outlets and the gas injection units and that direct the gas discharged from the discharge outlets to the gas injection units for injection; and a position adjusting unit that supports the plurality of gas injection units so that the positions of the gas injection units can be adjusted, wherein the position adjusting unit is capable of adjusting the positions of the plurality of gas injection units collectively.

12. A sorting device that performs sorting by injecting gas toward an object to be sorted, comprising:

a gas supply unit for supplying gas;

a gas distribution unit that distributes supplied gas to a plurality of discharge outlets;

a plurality of injection control units that control the discharge of gas from the discharge outlets;

a plurality of gas injection units;

a plurality of interconnection units, which are hoses or tubes formed of a flexible material, that are one-to-one flow paths between the discharge outlets and the gas injection units and that direct the gas discharged from the discharge outlets to the gas injection units for injection; and a position adjusting unit that supports the plurality of gas injection units so that the positions of the gas injection units can be adjusted, wherein the position adjusting unit is configured to collectively adjust the positions of the gas injection units within each of two or more groups of the plurality of gas injection units.

13. The sorting device according to claim 12, wherein the injection control unit gives notification of the gas injection by a predetermined method.

14. The sorting device according to claim 12, wherein the gas injection unit gives notification of the gas injection by a predetermined method.

15. The sorting device according to claim 12, further comprising a notification unit that detects gas injection from the gas injection unit and gives notification of the gas injection.

* * * * *